US011643532B2

(12) United States Patent
Kito et al.

(10) Patent No.: US 11,643,532 B2
(45) Date of Patent: May 9, 2023

(54) THERMOPLASTIC RESIN COMPOSITION, MOLDED OBJECT, AND PRODUCTION METHODS THEREFOR

(71) Applicant: TOYOTA BOSHOKU KABUSHIKI KAISHA, Aichi (JP)

(72) Inventors: Masayuki Kito, Okazaki (JP); Kosuke Geho, Toyota (JP); Mitsutaka Sako, Nagakute (JP); Goro Takahashi, Owariasahi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 67 days.

(21) Appl. No.: 16/604,387

(22) PCT Filed: Apr. 10, 2018

(86) PCT No.: PCT/JP2018/015147
§ 371 (c)(1),
(2) Date: Oct. 10, 2019

(87) PCT Pub. No.: WO2018/193922
PCT Pub. Date: Oct. 25, 2018

(65) Prior Publication Data
US 2020/0157325 A1 May 21, 2020

(30) Foreign Application Priority Data
Apr. 19, 2017 (JP) .............................. JP2017-083212

(51) Int. Cl.
| C08L 23/08 | (2006.01) |
| B29C 48/00 | (2019.01) |
| C08F 20/06 | (2006.01) |
| C08F 20/08 | (2006.01) |
| C08F 22/06 | (2006.01) |
| C08L 23/16 | (2006.01) |
| C08L 77/00 | (2006.01) |

(52) U.S. Cl.
CPC ........ *C08L 23/0815* (2013.01); *B29C 48/023* (2019.02); *C08F 20/06* (2013.01); *C08F 20/08* (2013.01); *C08F 22/06* (2013.01); *C08L 23/16* (2013.01); *C08L 77/00* (2013.01); *C08L 2203/18* (2013.01)

(58) Field of Classification Search
CPC ........................... C08L 23/02–24; C08L 23/26
See application file for complete search history.

(56) References Cited

U.S. PATENT DOCUMENTS

| 7,000,646 | B2 | 2/2006 | Mestemacher |
| 9,353,251 | B2 | 5/2016 | Kito et al. |
| 9,493,642 | B2 | 11/2016 | Kito et al. |
| 9,840,615 | B2 | 12/2017 | Kito et al. |
| 2004/0118468 | A1 | 6/2004 | Mestemacher |
| 2005/0048239 | A1 | 3/2005 | Mestemacher |
| 2006/0185750 | A1 | 8/2006 | Mestemacher |
| 2008/0060699 | A1 | 3/2008 | Mestemacher |
| 2014/0364569 | A1 | 12/2014 | Kito et al. |
| 2014/0371394 | A1 | 12/2014 | Kito et al. |
| 2017/0029610 | A1 | 2/2017 | Kito et al. |
| 2017/0174381 | A1* | 6/2017 | Fukushima ......... B29C 49/0005 |
| 2018/0334560 | A1 | 11/2018 | Kito et al. |
| 2019/0284380 | A1 | 9/2019 | Kato |
| 2020/0180535 | A1 | 6/2020 | Kito et al. |

FOREIGN PATENT DOCUMENTS

| CN | 104024324 A | 9/2014 |
| EP | 2796496 A | 10/2014 |
| EP | 2796497 A | 10/2014 |
| EP | 3385321 A | 10/2018 |
| EP | 3438180 A | 2/2019 |
| EP | 3492523 A | 6/2019 |
| JP | H09-249808 A | 9/1997 |
| JP | 2005-232353 A | 9/2005 |
| JP | 2006-504828 A | 2/2006 |
| JP | 2013-147645 | 8/2013 |
| JP | 2013-147646 | 8/2013 |
| JP | 2013-147647 | 8/2013 |
| JP | 2013-147648 | 8/2013 |
| JP | 2016-029290 A | 3/2016 |
| JP | 2016-222932 A | 12/2016 |
| JP | WO 2017/169575 A1 * | 10/2017 |
| WO | 91/02027 A | 2/1991 |

(Continued)

OTHER PUBLICATIONS

Office Action issued in corresponding Korean Application 10-2019-7029944, dated Jan. 12, 2021, with English machine translation.

(Continued)

*Primary Examiner* — Ana L. Woodward
(74) *Attorney, Agent, or Firm* — Greenblum & Bernstein, P.L.C.

(57) ABSTRACT

A thermoplastic resin composition, a molded body, and first and second production methods are disclosed. The thermoplastic resin composition contains a polyolefin resin, a polyamide resin, and a modified elastomer and shows non-Newtonian properties in a fluidized state. The molded body includes the thermoplastic resin composition. The first production method includes molding the thermoplastic resin composition at a shear rate of 80 $sec^{-1}$ or more and a standby step in which resin composition is on standby at a shear rate of 0 $sec^{-1}$ or more but less than 80 $sec^{-1}$. The second production method includes molding the resin composition at a shear rate $X_1$ to obtain part of a molded body and molding the resin composition at a shear rate $X_2$ to obtain another part of the molded body, wherein an absolute value of a difference between $X_1$ and $X_2$ is 200 $sec^{-1}$ or more.

2 Claims, 4 Drawing Sheets

(56) References Cited

FOREIGN PATENT DOCUMENTS

| WO | 2013/094763 | 6/2013 |
|----|-------------|--------|
| WO | 2013/094764 | 6/2013 |
| WO | 2018/021569 | 2/2018 |

OTHER PUBLICATIONS

The Office Action of the corresponding Japanese Application No. 2019-513570 dated Jul. 6, 2021, with English machine translation.
Singapore Office Action, Singapore Patent Office, Application No. 11201909015U, dated Jun. 29, 2020.
Korean Office Action, Korean Patent Office, Application No. 10-2019-7029944, dated Aug. 18, 2020, English translation.
Indian Office Action, Indian Patent Office, Application No. 201917042161, dated Aug. 25, 2020.
International Search Report issued in International Patent Application No. PCT/JP2018/015147, dated Jul. 17, 2018, along with English translation.
Extended European Search Report (EESR) of corresponding European Application No. 18788646.0, dated Nov. 23, 2020.
Office Action issued in corresponding Chinese Application No. 201880024379.6, dated Aug. 9, 2021 with English translation.
The Indian Office Action of the corresponding Indian Application No. 201917042161, dated Dec. 10, 2021.
Office Action issued in corresponding Japanese App. No. 2019-513570, dated Mar. 1, 2022, along with English translation.
Office Action issued in corresponding Chinese App. No. 201880024379.6 dated Mar. 23, 2022, along with its English translation.
Brazilian Office Action issued in corresponding Brazilian application No. 112019020626-4, dated Jul. 12, 2022, along with its English translation.

* cited by examiner

THERMOPLASTIC RESIN COMPOSITION, MOLDED OBJECT, AND PRODUCTION METHODS THEREFOR

TECHNICAL FIELD

The present invention relates to a thermoplastic resin composition, a molded body, and a method for producing the same. More specifically, the present invention relates to a thermoplastic resin composition containing a polyolefin resin and a polyamide resin, a molded body obtained by using such a thermoplastic resin composition, and a method for producing the same.

BACKGROUND ART

Studies have heretofore been made to obtain a resin mixture of different resins which is capable of exhibiting properties of the resins by itself or capable of exhibiting properties superior to those of the respective resins. For example, the following Patent Literatures 1 to 4 disclose resin mixtures using a polyolefin resin and a polyamide resin.

CITATIONS LIST

Patent Literatures

Patent Literature 1: JP 2013-147645 A
Patent Literature 2: JP 2013-147646 A
Patent Literature 3: JP 2013-147647 A
Patent Literature 4: JP 2013-147648 A

SUMMARY OF INVENTION

Technical Problems

The viscosity of a thermoplastic resin in a fluidized state greatly influences moldability. For example, a thermoplastic resin of injection molding grade has a low melt viscosity in a high shear rate range so as to be suitable for injection molding. This property can be achieved by, for example, controlling the molecular weight of a polymer constituting the thermoplastic resin so that the molecular weight is lower than a predetermined value. However, such a thermoplastic resin having a low melt viscosity in a high shear rate range has a low melt viscosity also in a low shear rate range. On the other hand, it is known that the melt viscosity of a thermoplastic resin in a low shear rate range can be increased by increasing the molecular weight of the thermoplastic resin. However, such a thermoplastic resin having a high molecular weight has a high melt viscosity also in a high shear rate range, which makes it difficult to perform injection molding in some cases. That is, when the melt viscosity is controlled by molecular weight, the property in a low shear rate range and the property in a high shear rate range are closely linked together, which makes it difficult to allow only one of the melt viscosity in a low shear rate range and the melt viscosity in a high shear rate range to fall within a desired range and to obtain a thermoplastic resin whose melt viscosity highly depends on shear rate. Further, the melt viscosity can be controlled by molecular weight control, but the molecular weight control also greatly influences the performance of a resulting molded body. Therefore, there is a problem that the molecular weight control cannot be performed only for the purpose of improving moldability.

In light of the above circumstances, it is an object of the present invention to provide a thermoplastic resin composition that contains a polyolefin resin and a polyamide resin and that has high shear-rate dependence in a fluidized state, a molded body obtained by using such a thermoplastic resin composition, and a method for producing the same.

Solutions to Problems

That is, the present invention provides the following.

A thermoplastic resin composition according to claim 1 includes a polyolefin resin, a polyamide resin, and a modified elastomer having a reactive group that reacts with the polyamide resin, and shows non-Newtonian properties in a fluidized state.

A thermoplastic resin composition according to claim 2 is the thermoplastic resin composition according to claim 1, in which when a melt viscosity at a shear rate of 12.16 sec$^{-1}$ and a temperature of 200° C. is defined as $V_1$ (Pa·s) and a melt viscosity at a shear rate of 608.0 sec$^{-1}$ and a temperature of 200° C. is defined as $V_3$ (Pa·s), a ratio $V_1/V_3$ is 6.5 or more.

A thermoplastic resin composition according to claim 3 is the thermoplastic resin composition according to claim 2, in which the melt viscosity $V_1$ is 1500 Pa·s or more.

A thermoplastic resin composition according to claim 4 is the thermoplastic resin composition according to any one of claims 1 to 3, in which a MFR at a temperature of 230° C. and a load of 2.16 kg is 20 g/10 min or less.

A thermoplastic resin composition according to claim 5 is the thermoplastic resin composition according to any one of claims 1 to 4, which has a continuous phase (A) formed of the polyolefin resin, and a dispersed phase (B) formed of the polyamide resin and the modified elastomer and dispersed in the continuous phase (A).

A thermoplastic resin composition according to claim 6 is the thermoplastic resin composition according to any one of claims 1 to 5, which is used in a method for producing a molded body, the method including: a molding step in which the thermoplastic resin composition is molded at a shear rate of 80 sec$^{-1}$ or more; and a standby step in which the thermoplastic resin composition is on standby at a shear rate of 0 sec$^{-1}$ or more but less than 80 sec$^{-1}$ after the molding step.

A molded body according to claim 7 includes the thermoplastic resin composition according to any one of claims 1 to 6.

A molded body according to claim 8 is the molded body according to claim 7, which has a wall portion made of the thermoplastic resin composition and a hollow portion surrounded by the wall portion.

A molded body according to claim 9 is the molded body according to claim 8, which is a tubular body formed by extrusion molding.

A molded body according to claim 10 is the molded body according to claim 7, which is a bottomed hollow body formed by blow molding.

A method for producing a molded body according to claim 11 is a method for producing a molded body using a thermoplastic resin composition containing a polyolefin resin, a polyamide resin, and a modified elastomer having a reactive group that reacts with the polyamide resin, and showing non-Newtonian properties in a fluidized state, the method including: a molding step in which the thermoplastic resin composition in the fluidized state is molded at a shear rate of 80 sec$^{-1}$ or more; and a standby step in which the thermoplastic resin composition is on standby at a shear rate of 0 sec$^{-1}$ or more but less than 80 sec$^{-1}$ after the molding step.

A method for producing a molded body according to claim 12 is a method for producing a molded body using a thermoplastic resin composition containing a polyolefin resin, a polyamide resin, and a modified elastomer having a reactive group that reacts with the polyamide resin, and showing non-Newtonian properties in a fluidized state, the method including: a first molding step in which the thermoplastic resin composition in the fluidized state is molded at a shear rate of $X_1$ (sec$^{-1}$) to obtain part of the molded body; and a second molding step in which the thermoplastic resin composition in the fluidized state is molded at a shear rate of $X_2$ (sec$^{-1}$) after the first molding step to obtain another part of the molded body, in which an absolute value of a difference between the $X_1$ and the $X_2$ is 200 sec$^{-1}$ or more.

Advantageous Effects of Invention

According to the present invention, it is possible to provide a thermoplastic resin composition that contains a polyolefin resin and a polyamide resin and that has high shear-rate dependence in a fluidized state.

According to the present invention, it is possible to provide a molded body by effectively utilizing non-Newtonian properties of the above-described thermoplastic resin composition. When the above-described thermoplastic resin composition is molded by a molding method having a step in which the thermoplastic resin composition is on standby at a shear rate of less than 80 sec$^{-1}$, it is possible to obtain a molded body having a non-conventional shape and using a thermoplastic resin composition containing a polyolefin resin and a polyamide resin.

According to the method for producing a molded body of the present invention, it is possible to produce a molded body having a non-conventional shape from a thermoplastic resin composition containing a polyolefin resin and a polyamide resin by utilizing the above-described thermoplastic resin composition that can be molded even by a molding method having a step in which the thermoplastic resin composition is on standby at a shear rate of less than 80 sec$^{-1}$.

According to the method for producing a molded body of the present invention including a molding step and a standby step, it is possible to produce a molded body having a non-conventional shape from a thermoplastic resin composition containing a polyolefin resin and a polyamide resin by utilizing the above-described thermoplastic resin composition that can be molded even by a molding method having a step in which the thermoplastic resin composition is on standby at a shear rate of less than 80 sec$^{-1}$.

According to the method for producing a molded body of the present invention including a first molding step and a second molding step, it is possible to produce a molded body by effectively utilizing a difference in moldability caused by a shear rate difference.

DESCRIPTION OF EMBODIMENTS

Figure 1:
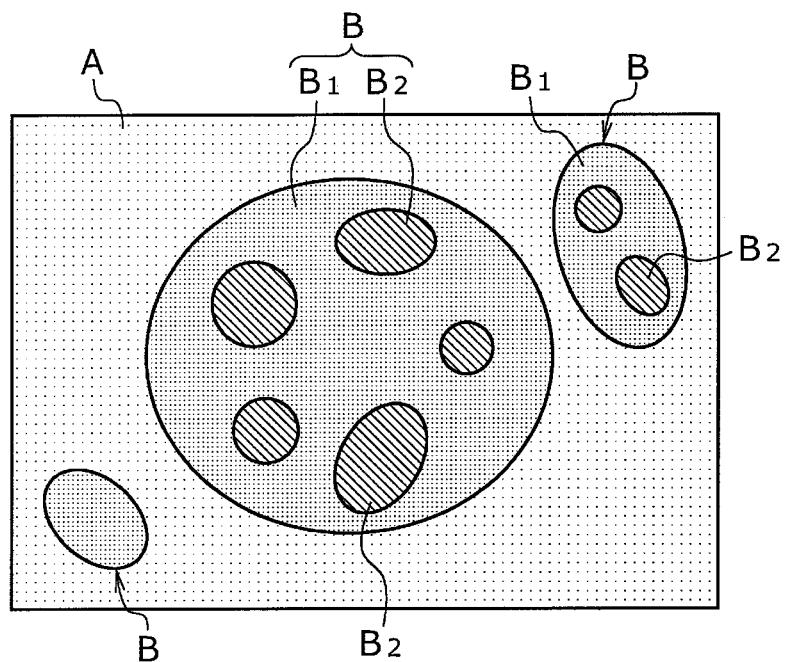
FIG. 1 is a schematic diagram for explaining an example of the phase structure of a thermoplastic resin composition according to the present invention.

The particulars shown herein are by way of example and for the purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, and the description taken with the drawings makes apparent to those skilled in the art how the several forms of the present invention may be embodied in practice.

[1] Thermoplastic Resin Composition

A thermoplastic resin composition according to the present invention contains a polyolefin resin, a polyamide resin, and a modified elastomer having a reactive group that reacts with the polyamide resin, and shows non-Newtonian properties in a fluidized state.

<1> Non-Newtonian Properties

The thermoplastic resin composition according to the present invention shows non-Newtonian properties in a fluidized state. This means that when stress is applied to the thermoplastic resin composition according to the present invention in a fluidized state, the viscosity of the thermoplastic resin composition changes depending on shear rate. The viscosity change usually occurs so that the viscosity at a high shear rate is lower than the viscosity at a low shear rate. The shear-rate dependence may be thixotropic or pseudoplastic. The fluidized state is not particularly limited, but is preferably a softened state or a melted state achieved by heating. More specifically, the fluidized state of the thermoplastic resin composition according to the present invention can usually be achieved at a temperature of 200° C. Particularly, the thermoplastic resin composition according to the present invention in a fluidized state preferably has a viscosity of 3000 Pa·s or less.

The thermoplastic resin composition according to the present invention has a high dependence of melting viscosity on shear rate in a relatively low shear rate range of 700 sec$^{-1}$ or less. More specifically, when the melt viscosity at a shear rate of 12.16 sec$^{-1}$ and a temperature of 200° C. is defined as $V_1$ (Pa·s) and the melt viscosity at a shear rate of 608.0 sec$^{-1}$ and a temperature of 200° C. is defined as $V_3$ (Pa·s), a ratio $V_1/V_3$ of 6.5 or more can be achieved.

As described above, the $V_1$ in a low shear rate range can be made 6.5 times or more higher than the $V_3$ in a relatively higher shear rate range. Therefore, when shear stress is not applied, the thermoplastic resin composition according to the present invention can keep a high viscosity and have shape retentivity even in a fluidized state. On the other hand, if necessary, the thermoplastic resin composition according to the present invention can be molded with a high degree of freedom by applying a high shear rate. Therefore, the thermoplastic resin composition according to the present invention can particularly suitably be used in a method for producing a molded body which has, between an upstream step and a downstream step, a standby step in which the thermoplastic resin composition is on standby in a state where no or a very low shear stress is applied to the thermoplastic resin composition. That is, the shape of a precursor molded body formed in the upstream step can accurately be maintained until the downstream step, and therefore molding can more reliably be performed in the downstream step.

Examples of such a molding method include various blow molding methods in which a parison (precursor molded body) is formed in an upstream step and is then on standby in a standby step, and air is blown into the parison in a downstream step. When blow molding is performed using the thermoplastic resin composition according to the present invention, it is possible to highly prevent a parison from having an uneven thickness. That is, when the thermoplastic resin composition according to the present invention is extruded through a die and released from shearing, its viscosity substantially increases. Therefore, it is possible to prevent draw-down of the parison. This makes it possible to prevent the parison from having an uneven thickness. Further, it is possible to easily form a parison having a larger self-weight than ever before. Further, it is possible to perform molding using a mold, such as injection molding, by using a high shear rate. This makes it possible to allow a parison to have an accurate shape.

Then, when the parison is on standby at a shear rate of less than 80 sec$^{-1}$ after the parison is formed and before a blow molding step, deformation such as draw-down of the parison can be prevented. Therefore, an apparatus can be used which has no means for maintaining the shape of a parison, such as a parison controller. Further, a resulting molded body can have a desired thickness (film thickness) accurately controlled.

It is to be noted that the upper limit of the ratio $V_1/V_3$ described above is not limited, but is usually 20 or less. That is, the ratio $V_1/V_3$ satisfies $6.5 \leq V_1/V_3 \leq 20$. Further, the ratio $V_1/V_3$ preferably satisfies $6.7 \leq V_1/V_3 \leq 18$, more preferably satisfies $7.6 \leq V_1/V_3 \leq 16$, even more preferably satisfies $7.9 \leq V_1/V_3 \leq 15$, even more preferably satisfies $8.2 \leq V_1/V_3 \leq 14$, particularly preferably satisfies $8.5 \leq V_1/V_3 \leq 13$, more particularly preferably satisfies $8.8 \leq V_1/V_3 \leq 12$.

Further, the thermoplastic resin composition according to the present invention can have high shear-rate dependence in a lower shear rate range. More specifically, when the melt viscosity at a shear rate of 12.16 sec$^{-1}$ and a temperature of 200° C. is defined as $V_1$ (Pa·s) and the melt viscosity at a shear rate of 60.80 sec$^{-1}$ and a temperature of 200° C. is defined as $V_2$ (Pa·s), a ratio $V_1/V_2$ of 2.2 or more can be achieved. This means that the melt viscosity can sharply be reduced by half or more by increasing the shear rate from 12.16 sec$^{-1}$ to 60.80 sec$^{-1}$. That is, the melt viscosity of the thermoplastic resin composition according to the present invention can very abruptly be changed in a low shear rate range of 80 sec$^{-1}$ or less.

The upper limit of the ratio $V_1/V_2$ is not limited, but is usually 6 or less. That is, the ratio $V_1/V_2$ satisfies $2.2 \leq V_1/V_2 \leq 6$. Further, the ratio $V_1/V_2$ preferably satisfies $2.25 \leq V_1/V_2 \leq 5.5$, more preferably satisfies $2.30 \leq V_1/V_2 \leq 4.7$, even more preferably satisfies $2.35 \leq V_1/V_2 \leq 4.0$, particularly preferably satisfies $2.40 \leq V_1/V_3 \leq 3.5$.

The magnitude of the above-described $V_1$ (melt viscosity at a shear rate of 12.16 sec$^{-1}$ and a temperature of 200° C.) is not limited, but usually satisfies $V_3 < V_2 < V_1$. For example, the $V_1$ may be 1500 Pa·s or more. When the $V_1$ is 1500 Pa·s or more, the shape of a precursor molded body can more accurately be maintained until a downstream step in the above-described method for producing a molded body including a standby step, and therefore molding can more reliably be performed in the downstream step. The upper limit of the $V_1$ is not limited, but is usually 7000 Pa·s or less. More specifically, the $V_1$ preferably satisfies $1500 \leq V_1$ (Pa·s) $\leq 5000$, more preferably satisfies $1700 \leq V_1$ (Pa·s) $\leq 4500$, even more preferably satisfies $1900 \leq V_1$ (Pa·s) $\leq 4000$, particularly preferably satisfies $2100 \leq V_1$ (Pa·s) $\leq 3500$.

The magnitude of the $V_2$ (melt viscosity at a shear rate of 60.80 sec$^{-1}$ and a temperature of 200° C.) is not limited, but usually satisfies $V_3 < V_2 < V_1$. For example, the $V_2$ may satisfy $600 \leq V_2$ (Pa·s) $\leq 2000$. When the $V_2$ is within this range, the shape of a precursor molded body can more accurately be maintained until a downstream step in the above-described method for producing a molded body including a standby step, and therefore molding can more reliably be performed in the downstream step. The $V_2$ preferably satisfies $700 \leq V_2$ (Pa·s) $\leq 1700$, more preferably satisfies $750 \leq V_2$ (Pa·s) $\leq 1500$, even more preferably satisfies $800 \leq V_2$ (Pa·s) $\leq 1300$.

The magnitude of the $V_3$ (melt viscosity at a shear rate of 608.0 sec$^{-1}$ and a temperature of 200° C.) is not limited, but usually satisfies $V_3 < V_2 < V_1$. For example, the $V_3$ may satisfy $150 \leq V_3$ (Pa·s) $\leq 900$. When the $V_3$ is within this range, molding can accurately be performed using a versatile molding method such as extrusion molding or injection molding. The $V_3$ preferably satisfies $160 \leq V_3$ (Pa·s) $\leq 700$, more preferably satisfies $170 \leq V_3$ (Pa·s) $\leq 500$, even more preferably satisfies $180 \leq V_3$ (Pa·s) $\leq 450$.

The MFR of the thermoplastic resin composition according to the present invention (measured in accordance with JIS K7210-1:2014) is not limited, but the thermoplastic resin composition according to the present invention may have a MFR of, for example, 20 g/10 min or less at a temperature of 230° C. and a load of 2.16 kg. The lower limit of the MFR is not limited, but is usually 1 g/10 min or more. When the MFR is such a low value, the shape of a precursor molded body can be maintained until a downstream step in the above-described method for producing a molded body including a standby step, and therefore molding can more reliably be performed. More specifically, the MFR may be 1 g/10 min or more but 20 g/10 min or less, and is preferably 1.5 g/10 min or more but 15 g/10 min or less, more preferably 2 g/10 min or more but 10 g/10 min or less, particularly preferably 2.3 g/10 min or more but 6 g/10 min or less.

<2> Polyolefin Resin

The polyolefin resin constituting the thermoplastic resin composition according to the present invention may be an olefin homopolymer and/or an olefin copolymer.

The olefin is not particularly limited, but examples thereof include ethylene, propylene, and an α-olefin having 4 to 8 carbon atoms. Examples of the α-olefin having 4 to 8 carbon atoms include 1-butene, 3-methyl-1-butene, 1-pentene, 3-methyl-1-pentene, 4-methyl-1-pentene, 1-hexene, and 1-octene. These olefins may be used singly or in combination of two or more of them.

Specific examples of the polyolefin resin include a polyethylene resin, a polypropylene resin, poly(1-butene), poly(1-hexene), and poly(4-methyl-1-pentene). These polymers may be used singly or in combination of two or more of them. That is, the polyolefin resin may be a mixture of the above-mentioned polymers.

Examples of the polyethylene resin include an ethylene homopolymer and a copolymer of ethylene and another olefin (except for ethylene). Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin (except for propylene). Examples of the latter include a propylene-ethylene copolymer and a propylene-1-butene copolymer (the content of a propylene-derived structural unit is 50% or more of the total structural units).

The copolymer of propylene and another olefin may be either a random copolymer or a block copolymer. Among them, a block copolymer is preferred from the viewpoint of exhibiting high shear-rate dependence in a fluidized state. Particularly, a propylene-ethylene block copolymer having ethylene as another olefin is preferred. Such a propylene-ethylene block copolymer is also called, for example, impact copolymer, polypropylene impact copolymer, heterophasic polypropylene, or heterophasic block polypropylene.

The weight-average molecular weight (based on polystyrene standards) of the polyolefin resin measured by gel permeation chromatography (GPC) is not particularly limited, and may be, for example, 10,000 or more but 500,000 or less, but is preferably 100,000 or more but 450,000 or less, more preferably 200,000 or more but 400,000 or less.

It is to be noted that the polyolefin resin is a polyolefin that has no affinity for the polyamide resin that will be described later and that has no reactive group that can react with the polyamide resin. In this point, the polyolefin resin is different from an olefin-based component as the modified elastomer that will be described later.

<3> Polyamide Resin

The polyamide resin constituting the thermoplastic resin composition according to the present invention is a polymer obtained by polymerizing a plurality of monomers via amide bonds (—NH—CO—).

Examples of a monomer constituting the polyamide resin include: amino acids such as 6-aminocaproic acid, 11-aminoundecanoic acid, 12-aminododecanoic acid, and para-aminomethyl benzoic acid; and lactams such as ε-caprolactam, undecane lactam, and ω-lauryl lactam. These monomers may be used singly or in combination of two or more of them.

The polyamide resin can be obtained also by copolymerization of a diamine and a dicarboxylic acid. In this case, examples of the diamine as a monomer include: aliphatic diamines such as ethylene diamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-dianimooctadecane, 1,19-diaminononadecane, 1,20-diaminoeicosane, 2-methyl-1,5-diaminopentane, and 2-methyl-1,8-diaminooctane; alicyclic diamines such as cyclohexane diamine and bis(4-aminocyclohexyl)methane; and aromatic diamines such as xylylene diamines (p-phenylenediamine and m-phenylenediamine). These diamines may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexane dicarboxylic acid; and aromatic dicarboxylic acids such as phthalic acid, terephthalic acid, isophthalic acid, and naphthalene dicarboxylic acid. These dicarboxylic acids may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-mentioned various polyamide resins, one may be used which has a structure in which the linear chain of a hydrocarbon group between adjacent amide bonds in a main chain has 6 or more carbon atoms (usually 16 carbon atoms or less) (in the present invention, also simply referred to as a "long chain structure"). That is, a polyamide resin having a long chain structure may be used. When a polyamide resin having a long chain structure is used, the content of the long chain structure is preferably 50% or more and may be 100% of all the structural units of the polyamide resin. Specific examples of such a polyamide resin include polyamide 11, polyamide 610, polyamide 612, polyamide 614, polyamide 12, polyamide 6T, polyamide 6I, polyamide 9T, polyamide 1010, polyamide 1012, polyamide 10T, and polyamide 9T/2M-8T. These polyamide resins may be used singly or in combination of two or more of them. The use of such a polyamide resin having a long chain structure makes it possible to provide a thermoplastic resin composition having excellent impact resistance.

Further, in the present invention, among the above-mentioned various polyamide resins, one derived from a plant may be used. A plant-derived polyamide resin is preferred from the viewpoint of environmental protection (particularly from the viewpoint of carbon neutral) because it uses a monomer obtained from a plant-derived component such as vegetable oil.

Examples of such a plant-derived polyamide resin include polyamide 11 (hereinafter also simply referred to as "PA11"), polyamide 610 (hereinafter also simply referred to as "PA610"), polyamide 612 (hereinafter also simply referred to as "PA612"), polyamide 614 (hereinafter also simply referred to as "PA614"), polyamide 1010 (hereinafter also simply referred to as "PA1010"), polyamide 1012 (hereinafter also simply referred to as "PA1012"), and polyamide 10T (hereinafter also simply referred to as "PA10T"). These plant-derived polyamide resins may be used singly or in combination of two or more of them.

Among the above-mentioned plant-derived polyamide resins, PA11 is superior to the other plant-derived polyamide resins in terms of low water absorbability, low specific gravity, and high biomass degree. Polyamide 610 is inferior to PA11 in water absorption rate, chemical resistance, and impact strength, but is excellent in heat resistance (melting point) and strength. Further, polyamide 610 is superior to polyamide 6 and polyamide 66 in terms of low water absorbability and size stability, and therefore can be used as an alternative to polyamide 6 or polyamide 66. Polyamide 1010 is superior to PA11 in heat resistance and strength. Further, polyamide 1010 is comparable in biomass degree to PA11, and can be used for parts required to have higher durability. Polyamide 10T contains an aromatic ring in its molecular skeleton, and therefore has a higher melting point and a higher strength than polyamide 1010. Therefore, the use of polyamide 10T makes it possible to use the thermoplastic resin composition in a harsher environment.

The weight-average molecular weight (based on polystyrene standards) of the polyamide resin measured by gel permeation chromatography (GPC) is not particularly limited, but may be, for example, 5,000 or more but 100,000 or less, and is preferably 7,500 or more but 50,000 or less, more preferably 10,000 or more but 50,000 or less.

<4> Modified Elastomer

The modified elastomer constituting the thermoplastic resin composition according to the present invention is an elastomer having a reactive group that reacts with the polyamide resin. The modified elastomer is preferably a component having affinity for the polyolefin resin. That is, the modified elastomer is preferably a component having compatibilizing effect on the polyamide resin and the polyolefin resin. In other words, the modified elastomer is preferably a compatibilizer for the polyamide resin and the polyolefin resin.

Examples of the reactive group include an acid anhydride group (—CO—O—OC—), a carboxyl group (—COOH), an epoxy group {—$C_2O$ (three-membered ring structure having two carbon atoms and one oxygen atom)}, an oxazoline group (—$C_3H_4NO$), and an isocyanate group (—NCO). These reactive groups may be used singly or in combination of two or more of them.

The amount of modification of the modified elastomer is not limited as long as the modified elastomer has one or more reactive groups per molecule. The modified elastomer preferably has 1 or more but 50 or less reactive groups, more preferably has 3 or more but 30 or less reactive groups, particularly preferably has 5 or more but 20 or less reactive groups per molecule.

Examples of the modified elastomer include a polymer using any monomer capable of introducing a reactive group (modified elastomer obtained by polymerization using a monomer capable of introducing a reactive group), a product obtained by oxidative decomposition of any polymer (modified elastomer having a reactive group formed by oxidative decomposition), and a product obtained by graft polymerization of an organic acid on any polymer (modified elastomer having a reactive group introduced by graft polymerization of an organic acid). These modified elastomers may be used singly or in combination of two or more of them.

Examples of the monomer capable of introducing a reactive group include a monomer having a polymerizable unsaturated bond and an acid anhydride group, a monomer having a polymerizable unsaturated bond and a carboxyl group, and a monomer having a polymerizable unsaturated bond and an epoxy group.

Specific examples of the monomer include: acid anhydrides such as maleic anhydride, itaconic anhydride, succinic anhydride, glutaric anhydride, adipic anhydride, citraconic anhydride, tetrahydrophthalic anhydride, and butenylsuccinic anhydride; and carboxylic acids such as maleic acid, itaconic acid, fumaric acid, acrylic acid, and methacrylic acid. These compounds may be used singly or in combination of two or more of them. Among these compounds, acid anhydrides are preferred, maleic anhydride and itaconic anhydride are more preferred, and maleic anhydride is particularly preferred.

The type of resin constituting the skeleton of the modified elastomer (hereinafter referred to as a "skeletal resin") is not particularly limited, and various thermoplastic resins may be used. As the skeletal resin, one or two or more of the above-mentioned various polyolefin resins may be used. Other examples of the skeletal resin include an olefin-based thermoplastic elastomer and a styrene-based thermoplastic elastomer. These skeletal resins may be used singly or in combination of two or more of them.

The olefin-based thermoplastic elastomer may be a copolymer obtained by copolymerization of two or more olefins. The olefins may be one or two or more of the various olefins mentioned above as examples of an olefin constituting the polyolefin resin. The olefin-based thermoplastic elastomer is particularly preferably a copolymer of ethylene and an α-olefin having 3 to 8 carbon atoms or a copolymer of propylene and an α-olefin having 4 to 8 carbon atoms.

Specific examples of the copolymer of ethylene and an α-olefin having 3 to 8 carbon atoms include an ethylene-propylene copolymer (EPR), an ethylene-1-butene copolymer (EBR), an ethylene-1-pentene copolymer, and an ethylene-1-octene copolymer (EOR).

Specific examples of the copolymer of propylene and an α-olefin having 4 to 8 carbon atoms include a propylene-1-butene copolymer (PBR), a propylene-1-pentene copolymer, and a propylene-1-octene copolymer (POR). These copolymers may be used singly or in combination of two or more of them.

On the other hand, examples of the styrene-based thermoplastic elastomer include a block copolymer of a styrene-based compound and a conjugated diene compound and a hydrogenated product thereof.

Examples of the styrene-based compound include styrene, alkyl styrenes such as α-methyl styrene, p-methyl styrene, and p-t-butyl styrene, p-methoxy styrene, and vinyl naphthalene. These styrene-based compounds may be used singly or in combination of two or more of them.

Examples of the conjugated diene compound include butadiene, isoprene, piperylene, methyl pentadiene, phenyl butadiene, 3,4-dimethyl-1,3-hexadiene, and 4,5-diethyl-1,3-octadiene. These conjugated diene compounds may be used singly or in combination of two or more of them.

Specific examples of the styrene-based thermoplastic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS). These styrene-based thermoplastic elastomers may be used singly or in combination of two or more of them. Among them, SEBS is preferred.

The weight-average molecular weight (based on polystyrene standards) of the modified elastomer measured by gel permeation chromatography (GPC) is not particularly limited, but may be, for example, 10,000 or more but 500,000 or less, and is preferably 35,000 or more but 500,000 or less, more preferably 35,000 or more but 300,000 or less.

<5> Other Components

The thermoplastic resin composition according to the present invention may include other components in addition to the polyolefin resin, the polyamide resin, and the modified elastomer. Examples of the other components include a filler (reinforcing filler), a nucleating agent, an antioxidant, a heat stabilizer, a weatherproofer, a light stabilizer, a plasticizer, a UV absorber, an antistatic agent, a flame retardant, a flame retardant aid, a slipping agent, an anti-blocking agent, an anti-fogging agent, a lubricant, an antimicrobial agent, a coloring agent (pigment, dye), a dispersant, a copper inhibitor, a neutralizer, an anti-foaming agent, a weld strength improver, a natural oil, a synthetic oil, and a wax. These other components may be used singly or in combination of two or more of them.

Examples of another thermoplastic resin include polyester-based resins (polybutylene terephthalate, polyethylene terephthalate, polycarbonate, polybutylene succinate, polyethylene succinate, and polylactic acid). These other thermoplastic resins may be used singly or in combination of two or more of them.

Examples of the filler include glass components (e.g., glass fibers, glass beads, glass flakes), silica, inorganic fibers (glass fibers, alumina fibers, carbon fibers), graphite, silicate compounds (e.g., calcium silicate, aluminum silicate, montmorillonite, kaolin, talc, clay), metal oxides (e.g., iron oxide, titanium oxide, zinc oxide, antimony oxide, alumina), carbonates and sulfates of metals such as lithium, calcium, magnesium, and zinc, metals (e.g., aluminum, iron, silver, copper), hydroxides (e.g., aluminum hydroxide, magnesium hydroxide), sulfides (e.g., barium sulfate), carbides (e.g., wood charcoal, bamboo charcoal), titanides (e.g., potassium titanate, barium titanate), organic fibers (e.g., aromatic polyester fibers, aromatic polyamide fibers, fluororesin fibers, polyimide fibers, plant fibers), and celluloses (e.g., cellulose microfibrils, cellulose acetate). These fillers may be used singly or in combination of two or more of them. These fillers can be used also as nucleating agents.

<6> Phase Structure

The phase structure of the thermoplastic resin composition according to the present invention is not limited, but the thermoplastic resin composition according to the present invention can have the following phase structure (1), (2), or (3).

Phase structure (1): A phase structure having a continuous phase (A) containing a polyolefin resin and a dispersed phase (B) dispersed in the continuous phase (A) and containing a polyamide resin and a modified elastomer (see FIG. 1). It is to be noted that the phase structure (1) does not coexist with another phase structure having a continuous phase containing a polyamide resin and a dispersed phase dispersed in the continuous phase.

Phase structure (2): A phase structure having a continuous phase containing a polyamide resin and a dispersed phase dispersed in the continuous phase and containing a polyolefin resin. It is to be noted that the phase structure (2) does not coexist with another phase structure having a continuous phase containing a polyolefin resin and a dispersed phase dispersed in the continuous phase.

Figure 2:
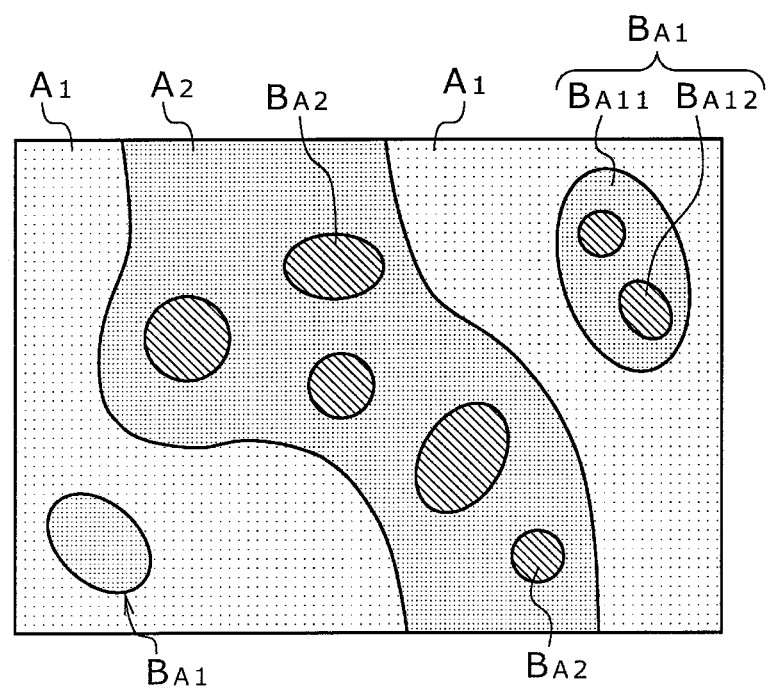
FIG. 2 is a schematic diagram for explaining another example of the phase structure of a thermoplastic resin composition according to the present invention.

Phase Structure (3): A phase structure having a continuous phase ($A_1$) containing a polyolefin resin, a dispersed phase ($B_{A1}$) dispersed in the continuous phase ($A_1$) and containing a polyamide resin and a modified elastomer, a continuous phase ($A_2$) containing a polyamide resin, and a dispersed phase ($B_{A2}$) dispersed in the continuous phase ($A_2$) and containing a modified elastomer (see FIG. 2).

Among these phase structures, the phase structure (1) or the phase structure (3) is preferred.

In the phase structure (1), the dispersed phase (B) may further have a continuous phase ($B_1$) present in the dispersed phase (B) and containing a polyamide resin and a fine dispersed phase ($B_2$) dispersed in the continuous phase ($B_1$) and containing a modified elastomer (see FIG. 1). In this case, the phase structure (1) is a multiple phase structure in which the fine dispersed phase ($B_2$) is further dispersed in the dispersed phase (B).

It is to be noted that the modified elastomer in the phase structure (1) may be an unreacted modified elastomer, a product obtained by reaction with the polyamide resin, or a mixture of them.

The phase structure (3) can be a co-continuous phase structure in which the continuous phase ($A_1$) and the continuous phase ($A_2$) coexist as two continuous phases. The dispersed phase ($B_{A1}$) in the continuous phase ($A_1$) may have a continuous phase ($B_{A11}$) present in the dispersed phase ($B_{A1}$) and containing a polyamide resin and a fine dispersed phase ($B_{A12}$) dispersed in the continuous phase ($B_{A11}$) and containing a modified elastomer. In this case, the phase structure (3) is a multiple phase structure in which the fine dispersed phase ($B_{A12}$) is further dispersed in the dispersed phase ($B_{A1}$).

It is to be noted that the modified elastomer in the phase structure (3) may be an unreacted modified elastomer, a product obtained by reaction with the polyamide resin, or a mixture of them.

In the case of the phase structure (1), the continuous phase (A) contains a polyolefin resin. The polyolefin resin is a main component of the continuous phase (A) (the ratio of the polyolefin resin is usually 70% by mass or more and may be 100% by mass with respect to the total mass of the continuous phase A). The dispersed phase (B) contains a polyamide resin and a modified elastomer. The polyamide resin (when the dispersed phase (B) contains a modified elastomer, the polyamide resin and the modified elastomer) is(are) a main component of the dispersed phase (B) (the ratio of the polyamide resin (the polyamide resin and the modified elastomer) is usually 70% by mass or more and may be 100% by mass with respect to the total mass of the dispersed phase B).

When the phase structure (1) is the above-described multiple phase structure, the continuous phase ($B_1$) contains a polyamide resin. The polyamide resin is a main component of the continuous phase ($B_1$) (the ratio of the polyamide resin is usually 70% by mass or more and may be 100% by mass with respect to the total mass of the continuous phase $B_1$). The fine dispersed phase ($B_2$) contains a modified elastomer. The modified elastomer is a main component of the fine dispersed phase ($B_2$) (the ratio of the modified elastomer is usually 70% by mass or more and may be 100% by mass with respect to the total mass of the fine dispersed phase $B_2$).

In the case of the phase structure (3), the continuous phase ($A_1$) contains a polyolefin resin. The polyolefin resin is a main component of the continuous phase ($A_1$) (the ratio of the polyolefin resin is usually 70% by mass or more and may be 100% by mass with respect to the total mass of the continuous phase $A_1$). The dispersed phase ($B_{A1}$) contains a polyamide resin and a modified elastomer. The polyamide resin and the modified elastomer are a main component of the dispersed phase ($B_{A1}$) (the ratio of the polyamide resin and the modified elastomer is usually 70% by mass or more and may be 100% by mass with respect to the total mass of the dispersed phase $B_{A1}$).

When the phase structure (3) is the above-described multiple phase structure, the continuous phase ($B_{A1}$) contains a polyamide resin. The polyamide resin is a main component of the continuous phase ($B_{A1}$) (the ratio of the polyamide resin is usually 70% by mass or more and may be 100% by mass with respect to the total mass of the continuous phase $B_{A11}$). The fine dispersed phase ($B_{A12}$) contains a modified elastomer. The modified elastomer is a main component of the fine dispersed phase ($B_{A12}$) (the ratio of the modified elastomer is usually 70% by mass or more and may be 100% by mass with respect to the total mass of the fine dispersed phase $B_{A12}$).

The continuous phase ($A_2$) contains a polyamide resin. The polyamide resin is a main component of the continuous phase ($A_2$) (the ratio of the polyamide resin is usually 70% by mass or more and may be 100% by mass with respect to the total mass of the continuous phase $A_2$). The dispersed phase ($B_{A2}$) dispersed in the continuous phase ($A_2$) contains a modified elastomer. The modified elastomer is a main component of the dispersed phase ($B_{A2}$) (the ratio of the modified elastomer is usually 70% by mass or more and may be 100% by mass with respect to the total mass of the dispersed phase $B_{A2}$).

When having the phase structure (1), the thermoplastic resin composition according to the present invention can exhibit high shear-rate dependence in a molten state. Particularly, the thermoplastic resin composition according to the present invention having the phase structure (1) can show an abrupt change in melt viscosity at a shear rate of less than 80 sec$^{-1}$. These phase structures can more reliably be obtained by melt-kneading a melt-kneaded product of a polyamide resin and a modified elastomer and a polyolefin resin as will be described later.

It is to be noted that, as described above, the thermoplastic resin composition according to the present invention may contain a reaction product obtained by reaction of the reactive group of the modified elastomer with the polyamide resin. In this case, in the phase structure (1), the reaction product can be present at, for example, the interface between the continuous phase (A) and the dispersed phase (B) and/or the interface between the continuous phase ($B_1$) and the fine dispersed phase ($B_2$). Similarly, in the phase structure (3), the reaction product can be present at, for example, the interface between the continuous phase ($A_1$) and the continuous phase ($A_2$), the interface between the continuous phase ($A_1$) and the dispersed phase ($B_{A1}$), and the interface between the continuous phase ($B_{11}$) and the fine dispersed phase ($B_{A12}$).

These various phase structures can be observed by observing the treated surface of a test specimen (a test specimen of the thermoplastic resin composition) subjected to oxygen plasma etching and then to osmium coating with a field-emission scanning electron microscope (FE-SEM). Particularly, the dispersed phase and the fine dispersed phase can be observed in an image enlarged 1000 times or more (usually 10,000 times or less) by such a method. A component constituting each of the phases can be identified by energy dispersive X-ray spectroscopy (EDS) during observation using the field-emission scanning electron microscope (FE-SEM).

The size of the dispersed phase (the dispersed phase B shown in FIG. 1, the dispersed phase $B_{A1}$ shown in FIG. 2) of the thermoplastic resin composition according to the present invention is not particularly limited, but the dispersion diameter (average dispersion diameter) of the dispersed phase is preferably 10000 nm or less, more preferably 50 nm or more but 8000 nm or less, even more preferably 100 nm or more but 4000 nm or less.

The dispersion diameter of the dispersed phase can be measured in an electron microscope image enlarged 1000 times or more. More specifically, 20 particles of the dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the dispersed phase.

The size of the fine dispersed phase (the fine dispersed phase $B_2$ shown in FIG. 1, the fine dispersed phase $B_{A12}$ shown in FIG. 2) contained in the dispersed phase (the dispersed phase B shown in FIG. 1, the dispersed phase $B_{A1}$ shown in FIG. 2) of the thermoplastic resin composition according to the present invention is not particularly limited, but the dispersion diameter (average dispersion diameter) of the fine dispersed phase is preferably 5 nm or more but 1000 nm or less, more preferably 5 nm or more but 600 nm or less, even more preferably 10 nm or more but 400 nm or less, particularly preferably 15 nm or more but 350 nm or less.

The dispersion diameter of the fine dispersed phase can be measured in an electron microscope image enlarged 1000 times or more. More specifically, 20 particles of the fine dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the fine dispersed phase.

<7> Blending

When the total of the polyolefin resin, the polyamide resin, and the modified elastomer in the thermoplastic resin composition according to the present invention is taken as 100% by mass, the ratio of the polyolefin resin may be 2% by mass or more but 90% by mass or less. This ratio is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less. When the ratio of the polyolefin resin is within the above range, the thermoplastic resin composition can exhibit high shear-rate dependence in a molten state.

When the total of the polyolefin resin, the polyamide resin, and the modified elastomer in the thermoplastic resin composition according to the present invention is taken as 100% by mass, the ratio of the polyamide resin and the modified elastomer (part or all of them may be reacted with each other) may be 10% by mass or more but 98% by mass or less. This ratio is preferably 15% by mass or more but 95% by mass or less, more preferably 17% by mass or more but 90% by mass or less, even more preferably 20% by mass or more but 85% by mass or less, even more preferably 22% by mass or more but 80% by mass or less, even more preferably 25% by mass or more but 75% by mass or less, even more preferably 27% by mass or more but 70% by mass or less, even more preferably 30% by mass or more but 65% by mass or less. When the ratio of the polyamide resin and the modified elastomer is within the above range, the thermoplastic resin composition can exhibit high shear-rate dependence in a molten state.

When the total of the polyolefin resin, the polyamide resin, and the modified elastomer in the thermoplastic resin composition according to the present invention is taken as 100% by mass, the ratio of the polyamide resin may be 1% by mass or more but 75% by mass or less. This ratio is preferably 2% by mass or more but 70% by mass or less, more preferably 4% by mass or more but 65% by mass or less, even more preferably 6% by mass or more but 60% by mass or less, even more preferably 8% by mass or more but 55% by mass or less, even more preferably 10% by mass or more but 50% by mass or less, even more preferably 12% by mass or more but 45% by mass or less, even more preferably 15% by mass or more but 40% by mass or less. When the ratio of the polyamide resin is within the above range, the thermoplastic resin composition can exhibit high shear-rate dependence in a molten state.

When the total of the polyolefin resin, the polyamide resin, and the modified elastomer in the thermoplastic resin composition according to the present invention is taken as 100% by mass, the ratio of the modified elastomer may be 1% by mass or more but 60% by mass or less. This ratio is preferably 2% by mass or more but 55% by mass or less, more preferably 4% by mass or more but 45% by mass or less, even more preferably 6% by mass or more but 40% by mass or less, even more preferably 8% by mass or more but 38% by mass or less, even more preferably 10% by mass or more but 37% by mass or less, even more preferably 12% by mass or more but 36% by mass or less, even more preferably 15% by mass or more but 35% by mass or less. When the ratio of the modified elastomer is within the above range, the thermoplastic resin composition can exhibit high shear-rate dependence in a molten state.

When the total of the polyolefin resin and the polyamide resin in the thermoplastic resin composition according to the present invention is taken as 100% by mass, the ratio of the polyamide resin may be 1.5% by mass or more but 88% by mass or less. This ratio is preferably 3% by mass or more but 75% by mass or less, more preferably 5% by mass or more but 70% by mass or less, even more preferably 10% by mass or more but 65% by mass or less, even more preferably 15% by mass or more but 60% by mass or less, even more preferably 18% by mass or more but 55% by mass or less, even more preferably 20% by mass or more but 50% by mass or less, even more preferably 25% by mass or more but 45% by mass or less. When the ratio of the polyamide resin is within the above range, the thermoplastic resin composition can exhibit high shear-rate dependence in a molten state.

When the total of the polyamide resin and the modified elastomer in the thermoplastic resin composition according to the present invention is taken as 100% by mass, the ratio of the modified elastomer may be 20% by mass or more but 90% by mass or less. This ratio is preferably 22% by mass or more but 88% by mass or less, more preferably 25% by mass or more but 86% by mass or less, even more preferably 27% by mass or more but 75% by mass or less, even more preferably 29% by mass or more but 70% by mass or less, even more preferably 32% by mass or more but 66% by mass or less, even more preferably 36% by mass or more but 60% by mass or less. When the ratio of the modified elastomer is within the above range, the thermoplastic resin composition can exhibit high shear-rate dependence in a molten state.

It is to be noted that in the case of the phase structure (1) described above (see FIG. 1), the ratio of the polyolefin resin when the total of the polyolefin resin, the polyamide resin, and the modified elastomer is taken as 100% by mass is usually equal to the ratio of the continuous phase (A) when the total mass of the phases is taken as 100% by mass. On the other hand, in the case of the phase structure (3) (see FIG. 2), the ratio of the polyolefin resin when the total of the polyolefin resin, the polyamide resin, and the modified elastomer is taken as 100% by mass is usually equal to the ratio of the continuous phase ($A_1$) when the total mass of the phases is taken as 100% by mass. The ratio mentioned herein refers to a volume ratio, and is usually also equal to an area ratio reflecting the volume ratio (the same applies hereinafter).

In the case of the phase structure (1) described above (see FIG. 1), the ratio of the polyamide resin and the modified elastomer when the total of the polyolefin resin, the polyamide resin, and the modified elastomer is taken as 100% by mass is usually equal to the ratio of the dispersed phase (B) when the total mass of the phases is taken as 100% by mass. On the other hand, in the case of the phase structure (3) (see FIG. 2), the ratio of the polyamide resin and the modified elastomer when the total of the polyolefin resin, the polyamide resin, and the modified elastomer is taken as 100% by mass is usually equal to the total ratio of the dispersed phase ($B_{A1}$), the continuous phase ($A_2$), and the dispersed phase ($B_{A2}$) when the total mass of the phases is taken as 100% by mass.

In the case of the phase structure (1) described above (see FIG. 1), the ratio of the polyamide resin when the total of the polyolefin resin, the polyamide resin, and the modified elastomer is taken as 100% by mass is usually equal to the ratio of the continuous phase ($B_1$) when the total mass of the phases is taken as 100% by mass. On the other hand, in the case of the phase structure (3) (see FIG. 2), the ratio of the polyamide resin when the total of the polyolefin resin, the polyamide resin, and the modified elastomer is taken as 100% by mass is usually equal to the total ratio of the continuous phase ($A_2$) and the continuous phase ($B_{A11}$) in the dispersed phase when the total mass of the phases is taken as 100% by mass.

In the case of the phase structure (1) described above (see FIG. 1), the ratio of the modified elastomer when the total of the polyolefin resin, the polyamide resin, and the modified elastomer is taken as 100% by mass is usually equal to the ratio of the fine dispersed phase ($B_2$) when the total mass of the phases is taken as 100% by mass. On the other hand, in the case of the phase structure (3) (see FIG. 2), the ratio of the modified elastomer when the total of the polyolefin resin, the polyamide resin, and the modified elastomer is taken as 100% by mass is usually equal to the total ratio of the fine dispersed phase ($B_{A12}$) and the dispersed phase ($B_{A2}$) when the total mass of the phases is taken as 100% by mass.

<8> Physical Properties

The composition according to the present invention can have high impact resistance or high flexural modulus or can have these properties at the same time. For example, the composition according to the present invention can have a Charpy impact strength of 5 kJ/m$^2$ or more but 150 kJ/m$^2$ or less and a flexural modulus of 430 MPa or more but 1500 MPa or less. Further, the composition according to the present invention can have a Charpy impact strength of 50 kJ/m$^2$ or more but 140 kJ/m$^2$ or less and a flexural modulus of 440 MPa or more but 1300 MPa or less. Further, the composition according to the present invention can have a Charpy impact strength of 60 kJ/m$^2$ or more but 135 kJ/m$^2$ or less and a flexural modulus of 450 MPa or more but 1250 MPa or less. Further, the composition according to the present invention can have a Charpy impact strength of 70 kJ/m$^2$ or more but 130 kJ/m$^2$ or less and a flexural modulus of 460 MPa or more but 1200 MPa or less. Further, the composition according to the present invention can have a Charpy impact strength of 80 kJ/m$^2$ or more but 125 kJ/m$^2$ or less and a flexural modulus of 470 MPa or more but 1100 MPa or less.

It is to be noted that the value of the Charpy impact strength is measured in accordance with JIS K7111-1 (type A notch, temperature: 23° C., edgewise test method). The value of the flexural modulus is measured in accordance with JIS K7171 (distance between support points: 64 mm, support at two support points with a curvature radius of 5 mm, curvature radius of point of application: 5 mm, load application rate: 2 mm/min).

<9> Production of Thermoplastic Resin Composition

A method for producing the thermoplastic resin composition according to the present invention is not limited, and the thermoplastic resin composition according to the present invention can be produced by a conventionally-known method. For example, the thermoplastic resin composition according to the present invention can be obtained by melt-kneading a melt-kneaded product of a polyamide resin and a modified elastomer and a polyolefin resin. At this time, preparation of the above-described melt-kneaded product and melt-kneading of the melt-kneaded product and a polyolefin resin may be performed using any melt-kneading device. Examples of the melt-kneading device include an extruder (e.g., a single-screw extruder, a twin-screw kneading extruder), a kneader, and a mixer (e.g., a high-speed flow mixer, a paddle mixer, a ribbon mixer).

It is to be noted that the melt-kneading temperature of the polyamide resin and the modified elastomer is not limited, and may be, for example, 190° C. or higher but 350° C. or lower, but is preferably 200° C. or higher but 330° C. or lower, more preferably 205° C. or higher but 310° C. or lower. The melt-kneading temperature of the obtained melt-kneaded product and the polyolefin resin is not limited, and may be, for example, 190° C. or higher but 350° C. or lower, but is preferably 200° C. or higher but 300° C. or lower, more preferably 205° C. or higher but 260° C. or lower.

<10> Uses of Thermoplastic Resin Composition

The thermoplastic resin composition according to the present invention can be used for any purpose. Particularly, the thermoplastic resin composition according to the present invention is preferably used in a method for producing a molded body, the method including a molding step in which molding is performed at a shear rate of 80 sec$^{-1}$ or more and a standby step in which a standby state is kept at a shear rate of 0 sec$^{-1}$ or more but less than 80 sec$^{-1}$ after the molding step.

In such a method including, between an upstream step (a molding step in which molding is performed at a shear rate of 80 sec$^{-1}$ or more) and a downstream step (a molding step in which molding is performed at a shear rate of 80 sec$^{-1}$ or more), a standby step in which a standby state is kept without shearing (i.e., at a shear rate of 0 sec$^{-1}$) or by applying a very low shear stress (i.e., at a shear rate of more than 0 sec$^{-1}$ but less than 80 sec$^{-1}$), the shape of a precursor molded body formed in the upstream step is well maintained until the downstream step is performed, and therefore a molded body can be obtained with a high degree of accuracy. In this regard, the above-described effect can particularly remarkably be obtained by using the thermoplastic resin composition according to the present invention. That is, as described above, the thermoplastic resin composition according to the present invention can have a property expressed by $V_1/V_3 \geq 6.5$. More specifically, the melt viscosity $V_1$ at a shear rate of 12.16 sec$^{-1}$ and the melt viscosity $V_3$ at a shear rate of 608.0 sec$^{-1}$ are extremely different from each other, and therefore the shape of a precursor molded body formed in the upstream step can accurately be maintained even during heating (without an increase in viscosity caused by cooling). Further, as described above, the thermoplastic resin composition according to the present invention can also have a property expressed by $2.2 \leq V_1/V_2 \leq 6$. That is, a difference in viscosity can be caused even during heating so that the melt viscosity $V_1$ at a shear rate of 12.16 sec$^{-1}$ can be made 2.2 times or more higher than the melt viscosity $V_2$ at a shear rate of 60.8 sec$^{-1}$. This makes it possible to accurately maintain the shape of a precursor molded body formed in the upstream step. Such a production method will be described later in detail.

[2] Molded Body

A molded body according to the present invention is made of the thermoplastic resin composition according to the present invention. The thermoplastic resin composition according to the present invention is as described above. The molded body according to the present invention may be a solid molded body (solid-core molded body, hollow-core molded body) or a foamed molded body. The molded body according to the present invention may be formed by any method, and a method for forming the molded body is not particularly limited. Examples of the method include blow molding (including injection blow molding and extrusion blow molding), inflation molding, hollow molding, vacuum molding, injection molding, extrusion molding (sheet extrusion, profile extrusion), T-die molding, compression molding, press molding, stamping molding, and transfer molding. These methods may be used singly or in combination of two or more of them.

The shape and dimensions, such as sizes and thickness, of the molded body are not particularly limited, either, and the uses of the molded body are not particularly limited, either. The molded body can be used as, for example, an exterior material, an interior material, a structural material, and an impact absorber for automobiles, railway vehicles, boats and ships, and airplanes. Examples of the automotive materials include automotive exterior materials, automotive interior materials, automotive structural materials, automotive impact absorbers, and engine room parts. Specific examples of the automotive materials include bumpers, spoilers, cowlings, front grilles, garnishes, hoods, trunk lids, cowl louvers, fender panels, rocker moldings, door panels, roof panels, instrument panels, center clusters, door trims, quarter trims, roof linings, pillar garnishes, deck trims, tonneau boards, package trays, dashboards, console boxes, kicking plates, switch bases, seat backboards, seat frames, armrests, sun visors, intake manifolds, engine head covers, engine under covers, oil filter housings, housings for car electronic parts (e.g., ECUs, TV monitors), air filter boxes, and various parts that may come into contact with fuel.

The molded body can also be used as, for example, an interior material, an exterior material, and a structural material for buildings and furniture. Specific examples thereof include door covering materials, door structural materials, and covering materials and structural materials for furniture (e.g., desks, chairs, shelves, chests of drawers). Further, the molded body can also be used as, for example, a package (e.g., a package capable of containing a liquid material, a fluent material, or a creamy material), a container (e.g., a tube, a pack, a bottle, a tray), a protective member, and a partition member. Further, the molded body can also be used as, for example, a housing and a structural body for home appliances (e.g., flat-screen TV sets refrigerators, washing machines, cleaners, mobile phones, portable game machines, notebook-size personal computers).

A molded body 1 according to the present invention is particularly suitable as a hollow molded body 1 having a hollow portion 2. That is, remarkable non-Newtonian properties found to be developed by the above-described thermoplastic resin composition can effectively be utilized when the hollow molded body 1 is produced. The hollow molded body 1 includes a wall portion 3 made of the thermoplastic resin composition and a hollow portion 2 surrounded by the wall portion 3 (see FIG. 3 and FIG. 4). Such a hollow molded body 1 can be obtained by extrusion molding or blow molding. Specific examples of the molded body 1 include a tubular body (see FIG. 3 and FIG. 4) and a bottomed hollow body (see FIG. 5).

Figure 3:
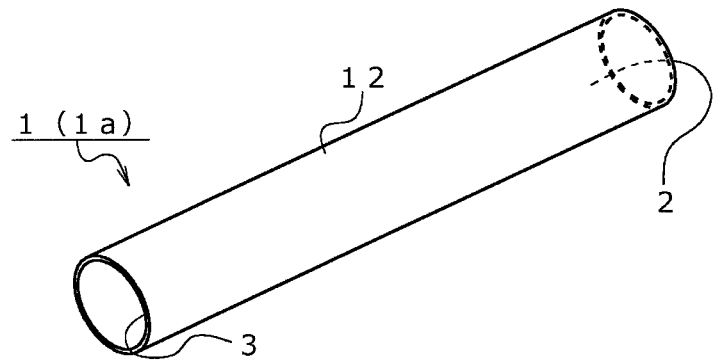
FIG. 3 is a schematic perspective view for explaining an example of a molded body according to the present invention.

Among them, a tubular body (linear tubular body) 1a shown in FIG. 3 can be obtained by extrusion molding or blow molding. Particularly, the thermoplastic resin composition according to the present invention shows remarkable non-Newtonian properties, and therefore has an advantage from the viewpoint that it is possible to remarkably prevent the drawdown of a molded article extruded by extrusion molding or a parison formed in an extrusion step (a step in which a parison is formed by extrusion molding) prior to a blow molding. More specifically, when extruded through a die, the thermoplastic resin composition is released from shearing so that a shear rate applied to the thermoplastic resin composition is rapidly reduced and therefore fluidity is sharply reduced (melt viscosity is increased). This makes it possible to remarkably prevent draw-down. Therefore, an extrusion molded article or a parison having high shape stability can be obtained. It is to be noted that when the tubular body 1a shown in FIG. 3 is obtained by blow molding, a parison formed to have a bottom is subjected to a blowing step (a step in which a gas is introduced into a parison in a mold so that the parison has a desired shape), and then the bottom of the parison is cut.

Figure 4:
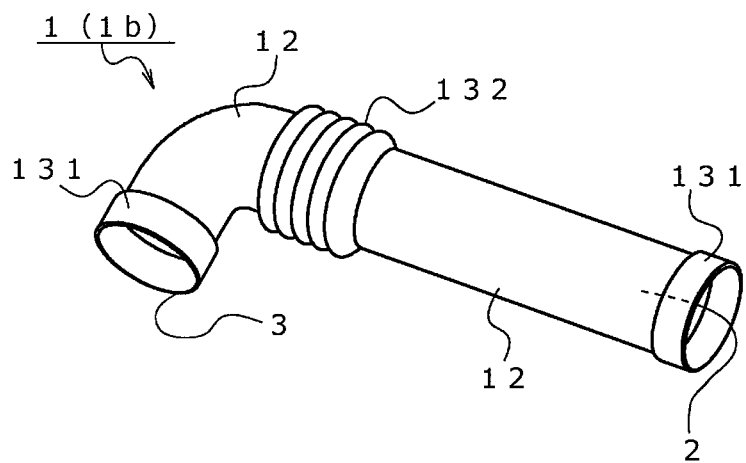
FIG. 4 is a schematic perspective view for explaining another example of a molded body according to the present invention.

A tubular body 1b shown in FIG. 4 can be obtained by, for example, using both injection molding and blow molding. The tubular body 1b shown in FIG. 4 includes a part 12, parts 131 having a thickness larger than that of the part 12, and a movable part 132 having a shape more complicated than those of the other parts. The part 12, the parts 131, and the part 132 are integrally formed.

The melt viscosity of a conventional thermoplastic resin composition of blow molding grade is controlled to be higher than that of a conventional thermoplastic resin composition of injection molding grade, but the conventional thermoplastic resin composition of blow molding grade does not have non-Newtonian properties. Therefore, the parts 131 cannot be obtained (in the case of blow molding, the parts 131 have substantially the same thickness as the part 12). Further, in order to obtain the part 132, multi-component molding needs to be performed so that the outside of the part 132 is made of the same thermoplastic resin as the part 12 and the inside of the part 132 is made of a soft thermoplastic resin.

On the other hand, the thermoplastic resin composition according to the present invention can have, at a high shear rate, a melt viscosity applicable to injection molding and can have, at a low shear rate, a melt viscosity suitable for excellent shape retentivity (i.e., the thermoplastic resin composition according to the present invention has non-Newtonian properties). Therefore, the parts 131 can be obtained by injection molding, and on the other hand, the part 12 and the part 132 can be obtained by blow molding. Further, the part 132 can be obtained using only the thermoplastic resin composition according to the present invention without performing multi-component molding. It is to be noted that, as in the case of the tubular body 1a, the tubular body 1b shown in FIG. 4 can be obtained by subjecting a parison formed to have a bottom to a blowing step and then cutting the bottom of the parison.

Figure 5:
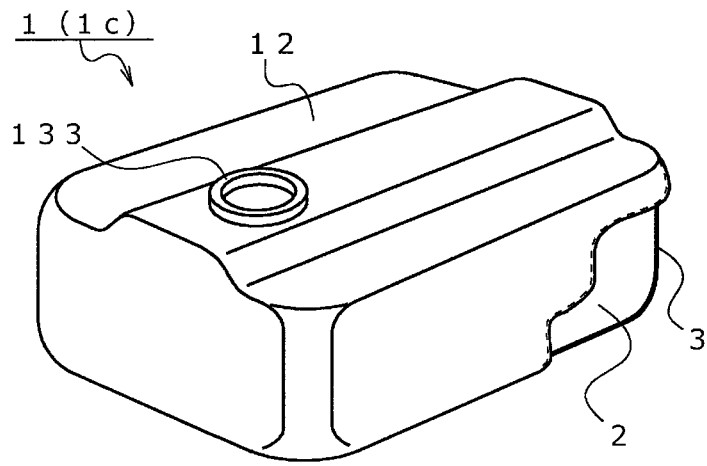
FIG. 5 is a schematic perspective view for explaining another example of a molded body according to the present invention.

A bottomed hollow body 1c shown in FIG. 5 can be obtained using both injection molding and blow molding. The bottomed hollow body 1c shown in FIG. 5 includes a part 12 and a part 133 having a thickness larger than that of the part 12 and high rigidity. The part 12 and the part 133 are integrally formed.

As described above, a conventional thermoplastic resin composition of blow molding grade cannot be used to obtain the part 133. Therefore, the part 133 is usually obtained by injection molding as a separate molded article and welded to the part 12 to obtain the entire bottomed hollow body 1c.

On the other hand, the thermoplastic resin composition according to the present invention can have, at a high shear rate, a melt viscosity applicable to injection molding and can have, at a low shear rate, a melt viscosity suitable for excellent shape retentivity (i.e., the thermoplastic resin composition according to the present invention has non-Newtonian properties). Therefore, the part 12 can be obtained by blow molding, and the part 133 can integrally be obtained by injection molding.

That is, it can be said that the molded body 1, such as the tubular body 1b shown in FIG. 4 or the bottomed hollow body 1c shown in FIG. 5 described above, having an opening portion (the part 131 shown in FIG. 4, the part 133 shown in FIG. 5) that connects the hollow portion 2 and the outside, has a larger thickness than the wall portion 3, and is integrally molded with the wall portion 3 is a molded body that can specifically be obtained using the thermoplastic resin composition according to the present invention.

Further, also in conventional blow molding, the melt viscosity of the thermoplastic resin composition according to the present invention can be reduced by performing blowing to form a parison into a desired shape at a high shear rate. This makes it possible to improve followability to a mold. Therefore, a more accurate and complicated shape can be given as compared with a case where a conventional thermoplastic resin composition is used.

As described above, the uses of the molded body 1 according to the present invention are not particularly limited. The thermoplastic resin composition constituting the molded body 1 according to the present invention contains a polyamide and is therefore excellent in fuel resistance, oil resistance, and chemical resistance. From such a viewpoint, the molded body 1 according to the present invention is suitable as various parts that may come into contact with fuel, oil, or a chemical. Examples of such parts include fuel tanks, fuel channel molded articles (e.g., fuel hoses), air ducts, various pipes and hoses (cooling pipes/hoses, cooling medium circulation pipes/hoses, brake pipes/hoses, brake fluid circulation pipes/hoses, wiper pipes/hoses, cleaning solution circulation pipes/hoses), and wipers.

[3] Method for Producing Molded Body (1) One of methods for producing a molded body according to the present invention is a method for producing a molded body using a thermoplastic resin composition containing a polyolefin resin, a polyamide resin, and a modified elastomer having a reactive group that reacts with the polyamide resin and showing non-Newtonian properties in a fluidized state, the method including: a molding step in which the thermoplastic resin composition in the fluidized state is molded at a shear rate of 80 $\sec^{-1}$ or more; and a standby step in which the thermoplastic resin composition is on standby at a shear rate of 0 $\sec^{-1}$ or more but less than 80 $\sec^{-1}$ after the molding step.

The "molding step" is a step in which the softened or melted thermoplastic resin composition is molded at a shear rate of 80 $\sec^{-1}$ or more. As described above, the thermoplastic resin composition according to the present invention can show high fluidity suitable for versatile molding methods at a shear rate of 80 $\sec^{-1}$ or more. Therefore, the molding step can be performed using, for example, extrusion molding or injection molding.

The "standby step" is a step in which a shear rate of 0 sec$^{-1}$ or more but less than 80 sec$^{-1}$ is used. The length of standby time is not particularly limited, but may be, for example, 0.1 seconds or more (usually 300 seconds or less), 0.2 seconds or more but 180 seconds or less, 0.3 seconds or more but 120 seconds or less, 0.4 seconds or more but 60 seconds or less, or 0.5 seconds or more but 30 seconds or less.

The standby step may be performed in a state where forced cooling (e.g., cooling by wind, cooling by contact with a cooling medium) is not performed. More specifically, the standby step may be performed in, for example, a natural cooling state or a heating state. That is, the production method using the thermoplastic resin composition according to the present invention makes it possible to maintain the shape of a precursor even in a state where forced cooling is not performed. The same applies to a case where the standby step is performed in a heating state.

Examples of the standby step include a standby step in which a molded body obtained by extrusion molding is on standby until it is cut and a standby step in which a molded body obtained by injection molding is removed from a mold after mold opening and is on standby until a resin is sufficiently cooled and solidified.

Further, the production method according to the present invention is suitable for various blow molding methods in addition to the above-described molding methods. Blow molding is performed through an upstream step in which a parison (precursor molded body) is formed, a standby step, and a downstream step in which the parison is subjected to blowing. As described above, the melt viscosity of the thermoplastic resin composition according to the present invention in a low shear rate range can be made, for example, 6.5 times or more higher than that in a high shear rate range. Therefore, the thermoplastic resin composition according to the present invention can maintain a high viscosity and have shape retentivity even in a fluidized state when a shear stress is not applied. On the other hand, if necessary, the thermoplastic resin composition according to the present invention can be molded with a high degree of freedom by applying a high shear rate. Therefore, in the case of blow molding, it is possible to highly prevent a parison from having an uneven thickness (that is, it is possible to prevent a parison from being deformed) and it is possible to use an apparatus having no means for maintaining the shape of a parison, such as a parison controller. A resulting molded body can have a desired thickness (film thickness) accurately controlled.

As described above, when the production method according to the present invention is used for blow molding, it can be said that the production method according to the present invention is a production method including two or more different molding steps in which a thermoplastic resin composition in a fluidized state is molded by applying a shear stress, in which the molding steps include a first molding step in which a precursor molded body is formed by applying a shear rate and a second molding step in which the precursor molded body is finally molded by applying a shear rate to the precursor molded body after the first molding step and a standby step.

Examples of a molding method used in the first molding step include extrusion molding and injection molding. On the other hand, examples of a molding method used in the second molding step include blowing molding.

When a shear rate applied to a thermoplastic resin composition in a fluidized state during molding in the first molding step is defined as $X_1$ (sec$^{-1}$) and a shear rate applied to the thermoplastic resin composition in a fluidized state during molding in the second molding step is defined as $X_2$ (sec$^{-1}$), the shear rate $X_1$ and the shear rate $X_2$ may be the same or different from each other.

When the absolute value of a difference between the shear rate $X_1$ and the shear rate $X_2$ is 200 (sec$^{-1}$) or more, the advantage of using the above-described thermoplastic resin composition according to the present invention is particularly great from the viewpoint of using the thermoplastic resin composition according to the present invention.

(2) The other method for producing a molded body according to the present invention is a method for producing a molded body using a thermoplastic resin composition containing a polyolefin resin, a polyamide resin, and a modified elastomer having a reactive group that reacts with the polyamide resin and showing non-Newtonian properties in a fluidized state, the method including: a first molding step in which the thermoplastic resin composition in the fluidized state is molded at a shear rate of $X_1$ (sec$^{-1}$) to obtain part of a molded body; and a second molding step in which the thermoplastic resin composition in the fluidized state is molded at a shear rate of $X_2$ (sec$^{-1}$) after the first molding step to obtain another part of the molded body, and an absolute value of a difference between the $X_1$ and the $X_2$ is 200 (sec$^{-1}$) or more.

Like the method according to the present invention, when two different molding steps are provided in which the thermoplastic resin composition according to the present invention is used and a difference between shear rates is 200 (sec$^{-1}$) or more, injection molding can be used for forming a parison. In conventional blow molding, a parison is formed using only extrusion molding. This is because a conventional thermoplastic resin composition of blow molding grade is controlled to have a higher melt viscosity than a thermoplastic resin composition of injection molding grade, and therefore cannot be subjected to injection molding.

On the other hand, the thermoplastic resin composition according to the present invention can be subjected to injection molding at a high shear rate. More specifically, injection molding can be performed using a shear rate higher than that during extrusion molding by 200 (sec$^{-1}$) or more. Further, the melt viscosity of a conventional thermoplastic resin composition depends on temperature, and therefore needs to be controlled only by a temperature change. On the other hand, the melt viscosity of the thermoplastic resin composition according to the present invention can be controlled also by a shear rate change. Therefore, the melt viscosity can be quickly controlled by changing the screw rotation speed or the flow channel diameter of an extruder or a kneader. That is, the melt viscosity can be controlled in a shorter time as compared with when the melt viscosity is controlled by a temperature change.

More specifically, a molded body in which an injection-molded part and a blow-molded part are integrally formed can be obtained in the following manner. In an upstream step of blow molding, a part to be subjected to shaping in a downstream step (blowing step) and a part whose shape is not to be changed in the downstream step are integrally formed in a parison, and then only the desired part is subjected to shaping by, for example, expansion in the blowing step.

For example, the part 131 and the part 132 of the tubular body 1b shown in FIG. 4 and the part 133 of the bottomed hollow body 1c shown in FIG. 5 can be formed by injection molding. On the other hand, the part 12 shown in FIG. 4 and the part 12 shown in FIG. 5 can be formed as blow-molded parts. In the injection-molded part, the thermoplastic resin composition injected into a mold is cooled in the mold and solidified in a non-fluidized state. On the other hand, the extrusion-molded part is integrally formed with the injection-molded part without using a mold, and is therefore kept in a fluidized state. Therefore, the extrusion-molded part can be subjected to shaping in the blowing step. In this way, a molded body can be obtained in which an injection-molded part and a blow-molded part are integrally formed.

The first molding step and the second molding step may be performed at the same time, but one of the steps may be performed in advance. When one of the steps is performed in advance, the shear rate $X_1$ and the shear rate $X_2$ preferably satisfy $X_1-X_2 \geq 200$ sec$^{-1}$. That is, the shear rate $X_1$ is preferably larger than the shear rate $X_2$. Therefore, when a parison is formed using an injection molding step and an extrusion molding step, it is preferred that injection molding is performed in the first molding step and extrusion molding is performed in the second molding step. As described above, "$X_1-X_2$ (sec$^{-1}$)" may satisfy $X_1-X_2$ (sec$^{-1}$)$\geq 200$, but preferably satisfies $200 \leq X_1-X_2$ (sec$^{-1}$)$\leq 1000$, more preferably satisfies $240 \leq X_1-X_2$ (sec$^{-1}$)$\leq 900$, even more preferably satisfies $270 \leq X_1-X_2$ (sec$^{-1}$)$\leq 800$, particularly preferably satisfies $300 \leq X_1-X_2$ (sec$^{-1}$)$\leq 700$.

Further, $X_1$ (sec$^{-1}$) may satisfy $X_1$ (sec$^{-1}$)$\geq 280$, but preferably satisfies $280 \leq X_1$ (sec$^{-1}$)$\leq 2500$, more preferably satisfies $340 \leq X_1$ (sec$^{-1}$)$\leq 2000$, even more preferably satisfies $400 \leq X_1$ (sec$^{-1}$)$\leq 1800$, particularly preferably satisfies $430 \leq X_1$ (sec$^{-1}$)$\leq 1500$.

EXAMPLES

Hereinafter, the present invention will be specifically described with reference to examples.

[1] Production of Thermoplastic Resin Composition (1) Thermoplastic Resin Composition of Example 1

Pellets of the following polyamide resin and pellets of the following modified elastomer were thy-blended, then fed into a twin screw melt-kneading extruder, and melt-kneaded at a melt-kneading temperature of 210° C. The thus obtained melt-kneaded product of the polyamide resin and the modified elastomer was pelletize by a pelletizer to obtain pellets of the melt-kneaded product. Further, the pellets (pellets of the melt-kneaded product of the polyamide resin and the modified elastomer) and pellets of the following polyolefin resin were dry-blended, then fed into a twin screw melt-kneading extruder, melt-kneaded at a melt-kneading temperature of 210° C., and pelletized by a pelletizer to obtain pellets made of a thermoplastic resin composition (Example 1).

The thermoplastic resin composition of Example 1 contained the polyolefin resin, the polyamide resin, and the modified elastomer in a mass ratio of 55:25:20. The thermoplastic resin composition having such a mass ratio has a phase structure (1) (see FIG. 1).

Polyolefin resin: polypropylene resin, homopolymer, manufactured by Japan Polypropylene Corporation under the trade name of "NOVATEC MA1B", weight-average molecular weight: 312,000, melting point: 165° C.)

Polyamide resin: Nylon 11 resin, manufactured by Arkema under the trade name of "Rilsan BMNO", weight-average molecular weight: 18,000, melting point: 190° C.

Modified elastomer: maleic anhydride-modified ethylene-butene copolymer (modified EBR), manufactured by Mitsui Chemicals, Inc. under the trade name of "TAFMER MH7020"

(2) Thermoplastic Resin Composition of Example 2

Pellets made of a thermoplastic resin composition (Example 2) were obtained in the same manner as in Example 1 described above. The thermoplastic resin composition of Example 2 contains the polyolefin resin, the polyamide resin, and the modified elastomer in a mass ratio of 32.5:42.5:25. The thermoplastic resin composition having such a mass ratio has a phase structure (3) (see FIG. 2). It is to be noted that the polyolefin resin, the polyamide resin, and the modified elastomer used are all the same as those used in Example 1.

(3) Thermoplastic Resin Composition of Comparative Example 1

As a thermoplastic resin composition of Comparative Example 1, pellets of the following resin were used.

Block-type polyolefin resin: polypropylene resin, block polymer, manufactured by Prime Polymer Co., Ltd. under the trade name of "J-452HP".

(4) Thermoplastic resin composition of Comparative Example 2

As a thermoplastic resin composition of Comparative Example 2, pellets of the following resin were used.

Talc-containing polyolefin resin: polypropylene (block polymer) containing 15% by mass of talc with respect to its total mass (100% by mass)

[2] Evaluation of Shear-Rate Dependence

The melt viscosities of each of the thermoplastic resin compositions (pellets) of Examples 1 and 2 and Comparative Examples 1 and 2 obtained above in [1] at various shear rates were measured under the following measuring conditions. The obtained results are shown in Table 1 and FIGS. 6 and 7.

Test standard: JIS K7199; 1999

Test machine: Capillary rheometer (manufactured by Toyo Seiki Seisaku-sho, Ltd., Type "Capilograph-1D")

Test temperature: 200° C.

Extrusion rate: 200 to 1 mm/min (shear rate: 12.16 to 2432 sec$^{-1}$)

Nozzle shape: L=10.0 mm, D=1.0 mm, Inflow angle: 180 degrees

Drying conditions: vacuum drying 80° C.×8 hours or more

TABLE 1

| Extrusion rate (mm/min) | Shear rate (sec$^{-1}$) | Example 1 Melt viscosity (Pa · s) | Example 2 Melt viscosity (Pa · s) | Comparative Example 1 Melt viscosity (Pa · s) | Comparative Example 2 Melt viscosity (Pa · s) |
|---|---|---|---|---|---|
| 200.0 | 2.432E+03 | 1.174E+02 | 1.680E+02 | 5.757E+01 | 6.379E+01 |
| 100.0 | 1.216E+03 | 1.769E+02 | 2.510E+02 | 8.686E+01 | 9.196E+01 |

TABLE 1-continued

| Extrusion rate (mm/min) | Shear rate (sec$^{-1}$) | Example 1 Melt viscosity (Pa · s) | Example 2 Melt viscosity (Pa · s) | Comparative Example 1 Melt viscosity (Pa · s) | Comparative Example 2 Melt viscosity (Pa · s) |
|---|---|---|---|---|---|
| 50.0 | 6.080E+02 | 2.633E+02 | 3.640E+02 | 1.305E+02 | 1.312E+02 |
| 20.0 | 2.432E+02 | 4.406E+02 | 5.630E+02 | 2.200E+02 | 2.048E+02 |
| 10.0 | 1.215E+02 | 6.643E+02 | 7.670E+02 | 3.129E+02 | 2.852E+02 |
| 5.0 | 6.080E+01 | 1.008E+03 | 1.081E+03 | 4.277E+02 | 3.901E+02 |
| 2.0 | 2.432E+01 | 1.702E+03 | 1.763E+03 | 6.142E+02 | 5.706E+02 |
| 1.0 | 1.216E+01 | 2.525E+03 | 2.501E+03 | 7.895E+02 | 7.630E+02 |

[3] Evaluation of MFR

The MFR of each of the thermoplastic resin compositions (pellets) of Examples 1 and 2 and Comparative Examples 1 and 2 obtained above in [1] at various shear rates were measured under the following measuring conditions.

Test standard: JIS K7120
Test machine: Melt indexer (manufactured by Toyo Seiki Seisaku-sho Ltd., Type "F-F01")
Test temperature: 230° C.
Test load: 2.16 kgf
Drying conditions: vacuum drying 80° C.×8 hours or more Measured results (averages of three measured values) are as follows.

Example 1: 3.3 g/10 min
Example 2: 3.7 g/10 min
Comparative Example 1: 25.9 g/10 min
Comparative Example 2: 33.0 g/10 min

[4] Effects of Examples

Figure 6:
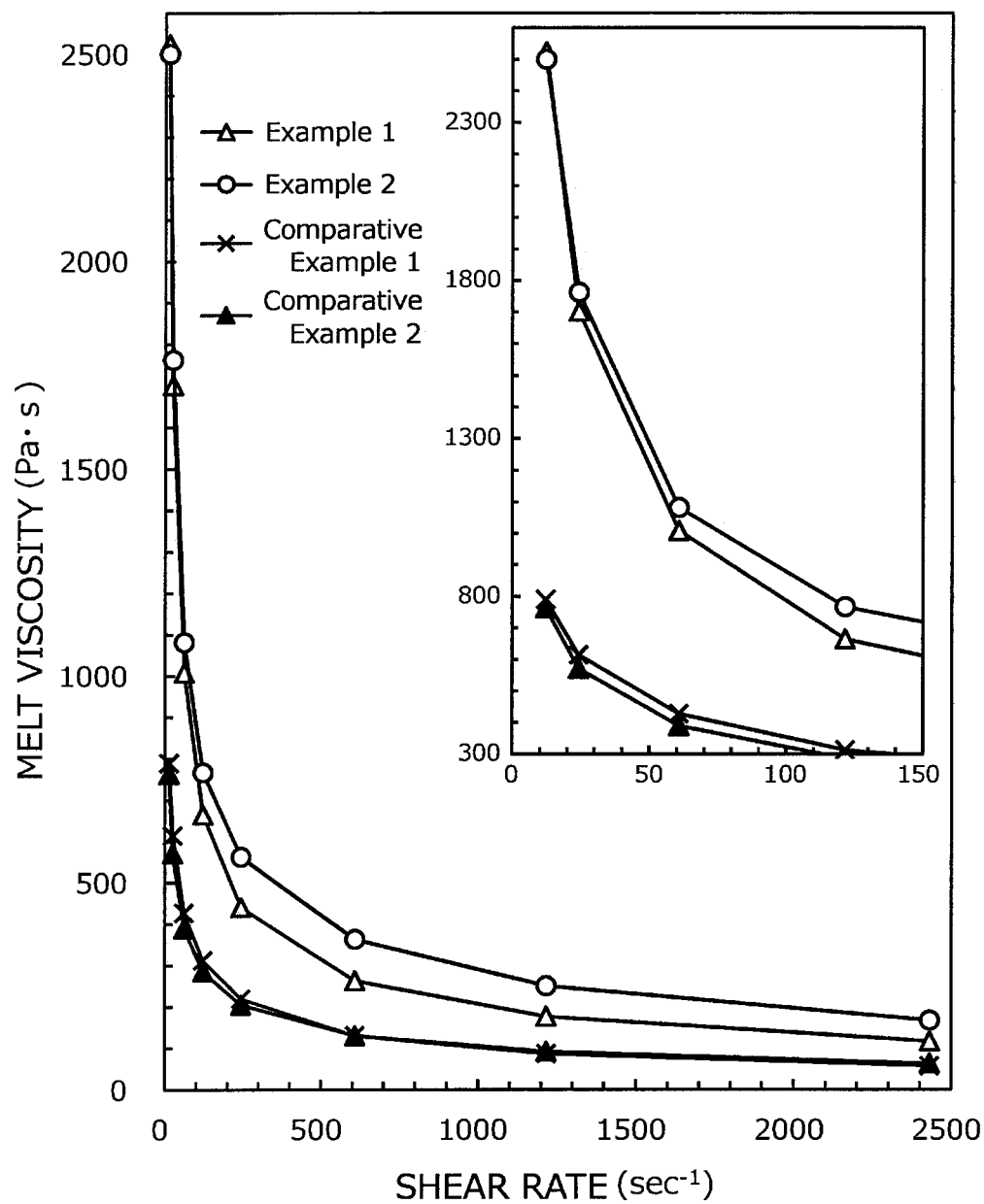
FIG. 6 is a graph (non-logarithmic) showing the shear-rate dependence of a thermoplastic resin composition according to the present invention.

From the results shown in Table 1 and FIG. 6, in Comparative Example 1, the $V_1$ (melt viscosity at a temperature of 200° C. and a shear rate of 12.16 sec$^{-1}$) was 789.5 Pa·s, the $V_2$ (melt viscosity at a temperature of 200° C. and a shear rate of 60.80 sec$^{-1}$) was 427.7 Pa·s, and the $V_3$ (melt viscosity at a temperature of 200° C. and a shear rate of 608.0 sec$^{-1}$) was 130.50 Pa·s. In Comparative Example 2, the $V_1$ was 763 Pa·s, the $V_2$ was 390.1 Pa·s, and the $V_3$ was 131.2 Pa·s. That is, the ratio $V_1/V_3$ and the ratio $V_1/V_2$ of Comparative Example 1 were 6.05 and 1.85, respectively, and the ratio $V_1/V_3$ and the ratio $V_1/V_2$ of Comparative Example 2 were 5.82 and 1.96, respectively.

On the other hand, the $V_1$, $V_2$, and $V_3$ of Example 2 were 2501 Pa·s, 1081 Pa·s, and 364.0 Pa·s, respectively. Therefore, the ratio $V_1/V_3$ and the ratio $V_1/V_2$ of Example 1 were 6.87 and 2.3, respectively. This reveals that the thermoplastic resin composition of Example 2 shows higher shear-rate dependence than the thermoplastic resin composition of Comparative Example 1 and the thermoplastic resin composition of Comparative Example 2. More specifically, the ratio $V_1/V_3$ of Example 2 increased by 13.6% compared to that of Comparative Example 1, and increased by 18.0% compared to that of Comparative Example 2. Further, the MFR of Example 2 was as very low as 3.7 g/10 min. This reveals that the thermoplastic resin composition of Example 2 can achieve higher shape retentivity in a state where no shear stress is applied as compared with the resins of Comparative Examples 1 and 2. On the other hand, the $V_3$ of Example 2 was as sufficiently low as 364.0 Pa·s. This reveals that if necessary, the thermoplastic resin composition of Example 2 can be molded with a high degree of freedom by applying a high shear rate.

Similarly, the $V_1$, $V_2$, and $V_3$ of Example 1 were 2525 Pa·s, 1008 Pa·s, and 263.3 Pa·s, respectively. Therefore, the ratio $V_1/V_3$ and the ratio $V_1/V_2$ of Example 1 were 9.59 and 2.5, respectively. This reveals that the thermoplastic resin composition of Example 1 shows much higher shear-rate dependence than the thermoplastic resin compositions of Comparative Examples 1 and 2. More specifically, the ratio $V_1/V_3$ of Example 1 increased by 58.5% compared to that of Comparative Example 1, and increased by 64.8% compared to that of Comparative Example 2. Further, the MFR of Example 1 was as very low as 3.3 g/10 min. This reveals that the thermoplastic resin composition of Example 1 can achieve higher shape retentivity in a state where no shear stress is applied as compared with the resins of Comparative Examples 1 and 2. On the other hand, the $V_3$ of Example 1 was as sufficiently low as 263.3 Pa·s. This reveals that if necessary, the thermoplastic resin composition of Example 1 can be molded with a high degree of freedom by applying a high shear rate.

Figure 7:
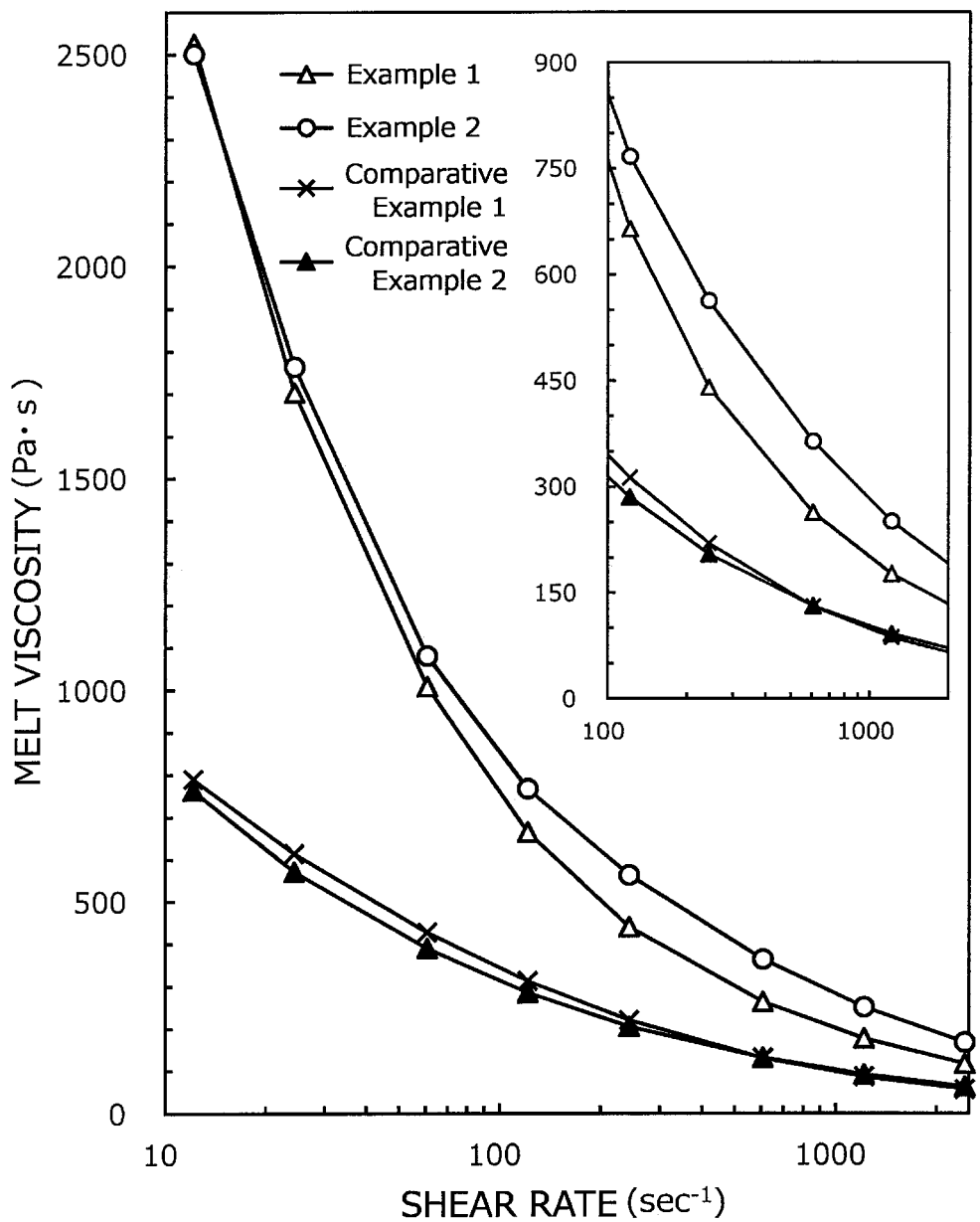
FIG. 7 is a graph (logarithmic) showing the shear-rate dependence of a thermoplastic resin composition according to the present invention.

It is generally known that a thermoplastic resin composition having high shear-rate dependence can be obtained by adding an inorganic filler to a thermoplastic resin. The thermoplastic resin composition of Comparative Example 2 contains 15% by mass of talc as an inorganic filler. That is, the thermoplastic resin composition of Comparative Example 2 is intended to increase shear-rate dependence by adding talc. However, as shown in FIG. 7 (logarithmic plot), the difference in shear-rate dependence occurs only at a shear rate of 100 sec$^{-1}$ or less, and the effect of talc is not great.

On the other hand, the difference in shear-rate dependence between Example 1 and Example 2 is larger than that between Comparative Example 1 and Comparative Example 2. The difference in shear-rate dependence between Example 1 and Example 2 is caused by the difference in the blending ratio of the three components. That is, the shear-rate dependence can greatly be changed by changing the blending ratio of the three components, the polyolefin, the polyamide, and the modified elastomer without adding a foreign material such as an inorganic filler. Further, as described above, the shear-rate dependence most greatly changes in the range of 100 to 1000 sec$^{-1}$. That is, the shear-rate dependence can actively be changed in a shear rate range where the shear-rate dependence is difficult to control by adding an inorganic filler.

The above-described examples are for illustrative purposes only, and shall not be construed as limiting the present invention. Although the present invention has been described with reference to exemplary embodiments, it is understood that the words used in the description and drawings of the present invention are explanatory and illustrative rather than restrictive. As described in detail herein, modifications may be made to the embodiments within the scope of the appended claims without departing from the scope and spirit of the present invention. Although the present invention has been described in detail with reference to particular structures, materials, and examples, the present invention is not intended to be limited to the particulars disclosed herein, rather the present invention extends to all the functionally-equivalent structures, methods, and uses within the scope of the appended claims.

REFERENCE SIGNS LIST

A Continuous phase
B Dispersed phase
$B_1$ Continuous phase (Continuous phase in dispersed phase B)
$B_2$ Fine dispersed phase (Dispersed phase in dispersed phase B)
$A_1$, $A_2$ Continuous phase
$B_{A1}$, $B_{A2}$ Dispersed phase
$B_{A11}$ Continuous phase (Continuous phase in dispersed phase $B_{A1}$)
$B_{A12}$ Fine dispersed phase (Dispersed phase in dispersed phase $B_{A1}$)
1 Molded body (Hollow molded body, Tubular body, Bottomed hollow body)
1a Tubular body
1b Tubular body
1c Bottomed hollow body
2 Hollow portion
3 Wall portion

The invention claimed is:

1. A molded body which is a bottomed hollow body formed integrally by injection molding and blow molding, comprising:
   a wall portion made of a thermoplastic resin composition;
   a hollow portion surrounded by the wall portion;
   an opening that is formed at the top of the hollow portion that connects the hollow portion and the outside of the molded body, and the opening has smaller size than the diameter of the hollow portion; and
   a thicker part formed at the periphery of the opening which is made of the thermoplastic resin composition;
   wherein the molded body comprises a first part formed by blow molding and a second part formed by injection molding that is thicker and more rigid than the first part,
   wherein the first part includes the wall portion and the second part includes the thicker part,
   wherein the thermoplastic resin composition comprises a polyamide resin, a polyolefin resin having no reactive group that reacts with the polyamide resin, and a modified elastomer having a reactive group that reacts with the polyamide resin,
   wherein the thermoplastic resin composition shows non-Newton properties in which a viscosity of the thermoplastic resin composition at a high shear rate is lower than a viscosity of the thermoplastic resin composition at a low shear rate in a fluidized state,
   wherein a melt viscosity $V_1$ of the thermoplastic resin composition is 1500 Pa·s or more, the melt viscosity $V_1$ being a melt viscosity of the thermoplastic resin composition at a temperature of 200° C. and a shear rate of 12.16 $sec^{-1}$,
   wherein the thermoplastic resin composition has a melt viscosity ratio $V_1/V_3$ of 6.5 or more, where $V_1$ is the melt viscosity $V_1$, and $V_3$ is a melt viscosity of the thermoplastic resin composition at a temperature of 200° C. and a shear rate of 608.0 $sec^{-1}$, and
   wherein the thermoplastic resin composition has a melt flow rate (MFR) at a temperature of 230° C. and a load of 2.16 kg that is in a range of from 2.3 g/10 min to 6 g/10 min.

2. The molded body according to claim 1, the thermoplastic resin composition comprising:
   a continuous phase (A) formed of the polyolefin resin; and
   a dispersed phase (B) formed of the polyamide resin and the modified elastomer and dispersed in the continuous phase (A).

* * * * *